United States Patent
Wu

(10) Patent No.: US 6,511,248 B2
(45) Date of Patent: Jan. 28, 2003

(54) BRAKE WIRE CONNECTING DEVICE FOR A STUNT BIKE

(76) Inventor: Chin-Chang Wu, No. 9, Alley 12, Lane 108, Yungfeng Rd., Taiping City, Taichung Hsien (TW)

( * ) Notice: Subject to any disclaimer, the term of this patent is extended or adjusted under 35 U.S.C. 154(b) by 0 days.

(21) Appl. No.: 09/826,881

(22) Filed: Apr. 6, 2001

(65) Prior Publication Data

US 2002/0146280 A1 Oct. 10, 2002

(51) Int. Cl.[7] .................................................. F16C 1/26
(52) U.S. Cl. ........................................ 403/220; 74/502.6
(58) Field of Search ............................ 74/502.6, 502.4; 403/220

(56) References Cited

U.S. PATENT DOCUMENTS

| | | | | |
|---|---|---|---|---|
| 4,811,620 A | * | 3/1989 | Old et al. ...................... | 74/474 |
| 5,094,322 A | * | 3/1992 | Casillas .................... | 188/24.22 |
| 5,138,898 A | * | 8/1992 | Pospispil et al. .......... | 74/502.6 |
| 5,829,314 A | * | 11/1998 | Scura ........................ | 74/502.4 |
| 6,085,611 A | * | 7/2000 | Valdez ....................... | 74/501.6 |

* cited by examiner

Primary Examiner—Lynne H. Browne
Assistant Examiner—Kenn Thompson
(74) Attorney, Agent, or Firm—Rosenberg, Klein & Lee

(57) ABSTRACT

A brake wire connecting device for a stunt bike has an upper shell and a lower shell threadingly connected together to form a housing. A connector disposed inside the housing has two branch wires attached on the bottom portion of the connector and each of the branch wires extends out of the housing through two stepped bores defined inside the lower shell. A main wire has a first end mounted with a stub and a second end mounted with a stopper. The second end extends into the upper shell and is pivotally received in a slot defined in the connector. The upper shell and the lower shell are detachable which allows inspection and maintenance inside the housing, and also the main wire pivotally received is detachable from the connector such that replacing the main wire and the branch wires is possible.

2 Claims, 4 Drawing Sheets

BRAKE WIRE CONNECTING DEVICE FOR A STUNT BIKE

BACKGROUND OF THE INVENTION

1. Field of the Invention

The present invention relates to a brake wire connecting device, and more particularly to a brake wire connecting device for a stunt bike, wherein brake wires of the stunt bike are able to be conveniently inspected and easily replaced.

2. Description of Related Art

In order to perform stunts, stunt bikes have brake systems which allow a handlebar stem of the stunt bike to rotate freely in 360 degrees. With reference to FIG. 4, a conventional brake wire connecting device used in the brake system of the stunt bike includes a main wire (90) having a first end securely mounted with a stub (91), and a second end extending into a housing (92), wherein the second end is securely mounted on a top of a connector (93). The connector (93) is disposed inside the housing (92), and a bottom of the connector (93) is securely attached with two branch wires (95). Each of the two branch wires (95) extends out of the housing (92) through respective stepped bores (94) defined in a bottom portion of the housing (92).

When assembled onto the stunt bike, the stub (91) is connected to the handlebar stem (not shown), and the branch wire (95) is connected to a rotatable disk (not shown). The rotatable disk is able to rotate when continually turning the handlebar stem of the bike, such that twisting of the main wire (90) and the branch wire (95) is prevented.

However, shortcomings of the conventional brake wire connecting device are as followed:

1. Main components of the brake wire connecting device which are the housing (92), the main wire (90), and the branch wires (95) are securely formed together. In case of malfunction, replacement of one of the main components is not easy, and a repair is usually done by replacing the whole brake wire connecting device. The repair is quite a waste because some of the components might still be useful.
2. The connector (93) is tightly sealed inside the housing (92), such that a connecting condition between the connector (93), the main wire (90), and the branch wire (95) is not able to be inspected. Maintenance inside the housing (92) is also a problem. The problem of not being able to inspect or maintain the connecting device is serious and may jeopardize the safety of the stunt performance.
3. When assembling the brake wire connecting device onto the stunt bike, the stub (31) mounted on the main wire (30) is securely received in a hole of the handlebar stem, and the branch wires are connected to the rotatable disk. The main wire (30) may become kinked if the stub (91) is not properly assembled onto the handlebar stem. The kinking of the main wire may cause stiffness and a lack of response during brake actions.

To overcome the shortcomings, the present invention tends to provide a brake wire connecting device for a stunt bike to mitigate or obviate the aforementioned problems.

SUMMARY OF THE INVENTION

The primary objective of the present invention is to provide a brake wire connecting device for a stunt bike, such that each of main components of the brake wire connecting device is able to be replaced respectively and easily when a malfunction occurs.

Another objective of the present invention is to provide a brake wire connecting device for a stunt bike, such that inspection and maintenance inside a housing of the brake wire connecting device is possible.

Another objective of the present invention is to provide a brake wire connecting device in which a main wire of the brake wire connecting device is prevented from kinking whereby smoothness during brake actions is ensured.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
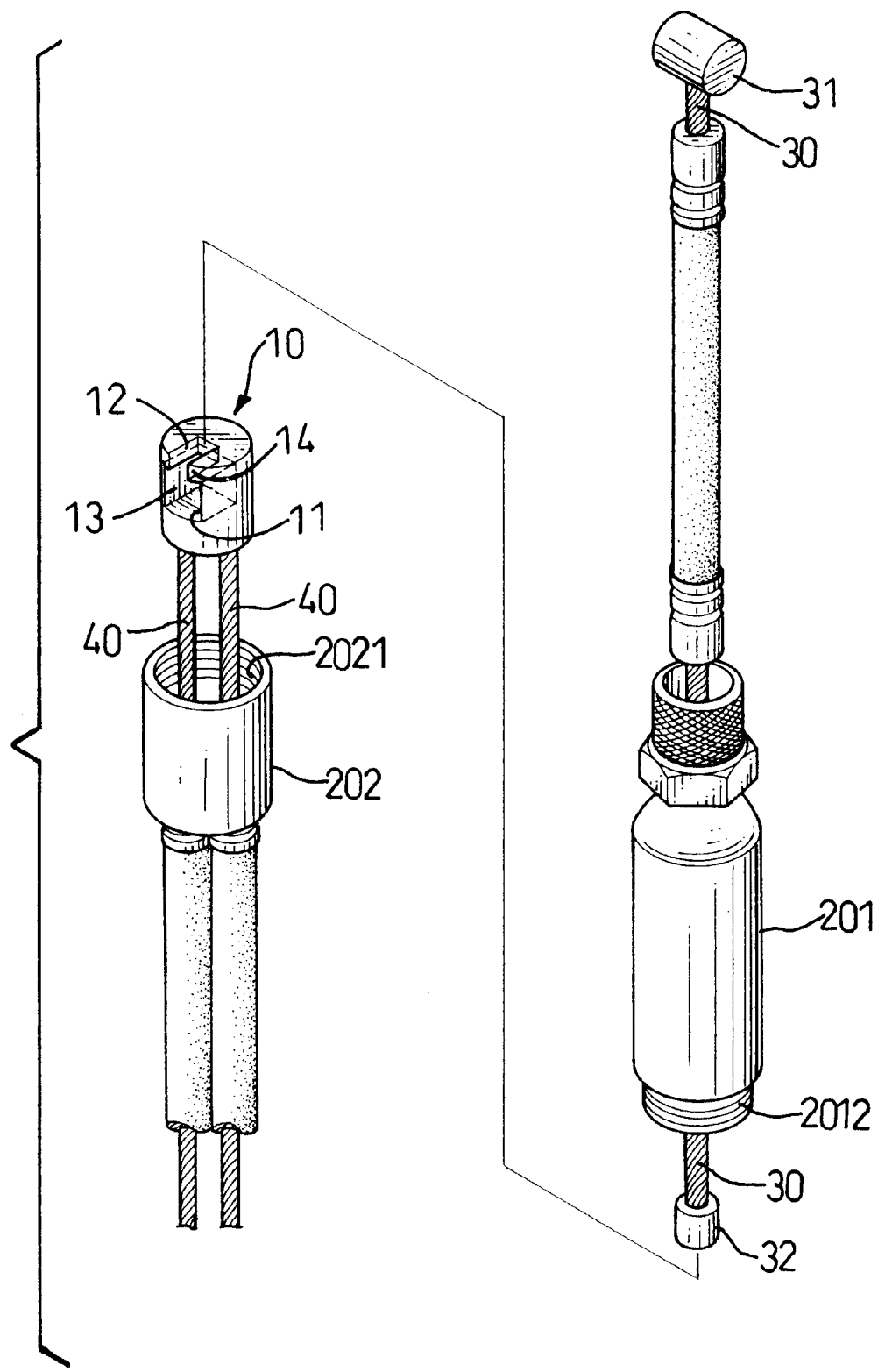
FIG. 1 is an exploded, perspective view of a brake wire connecting device for a stunt bike in accordance with the present invention.
Figure 2:
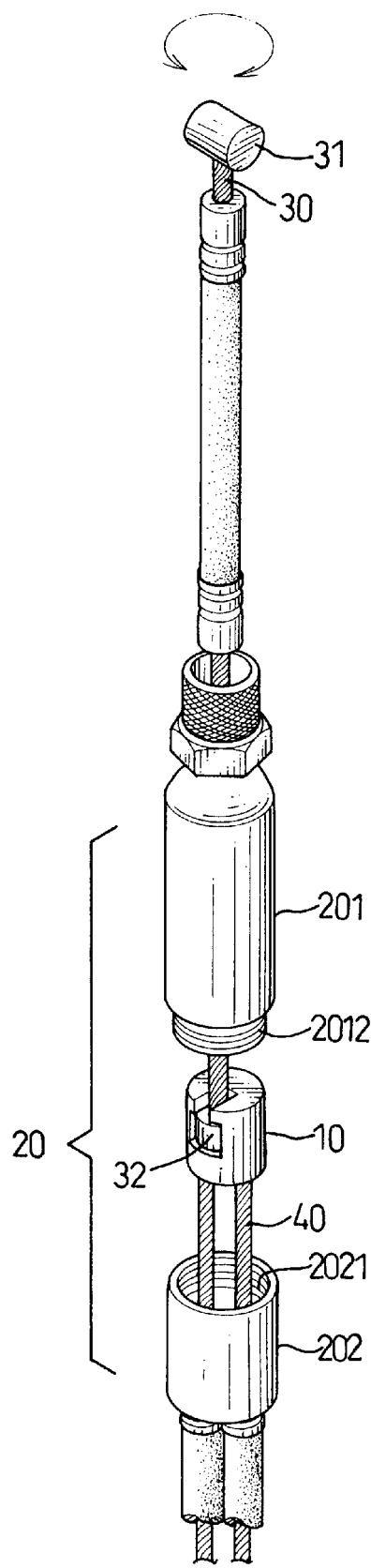
FIG. 2 is a perspective view of the brake wire connecting device for the stunt bike.

With reference to FIGS. 1 and 2, a brake wire-connecting device for a stunt bike in accordance with the present invention includes a connector (10), a housing (20), a main wire (30) and two branch wires (40).

The connector (10) is a cylinder with a slot (11) defined in a top surface thereof. The connector (10) has a top opening (12) defined in the top surface of the connector (10) and a side opening (13) defined in a side surface of the connector (10). Both of the top opening (12) and the side opening (13) communicate with the slot (11). A neck (14) is formed along a periphery defining the top opening (12). The two branch wires (40) are securely attached to a bottom surface of the connector (10).

Figure 3:
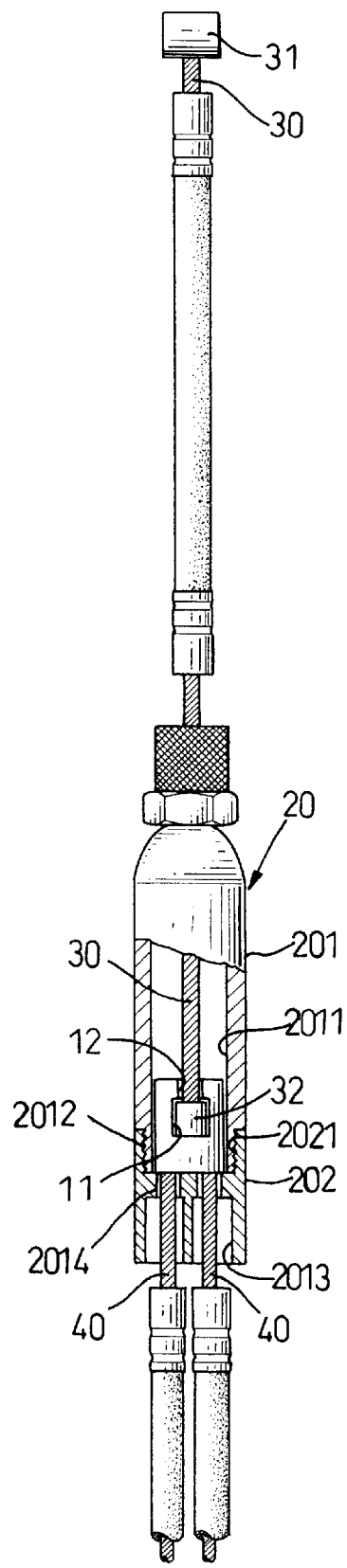
FIG. 3 is a partially cross-sectional view of the brake wire connecting device for the stunt bike.
Figure 4:
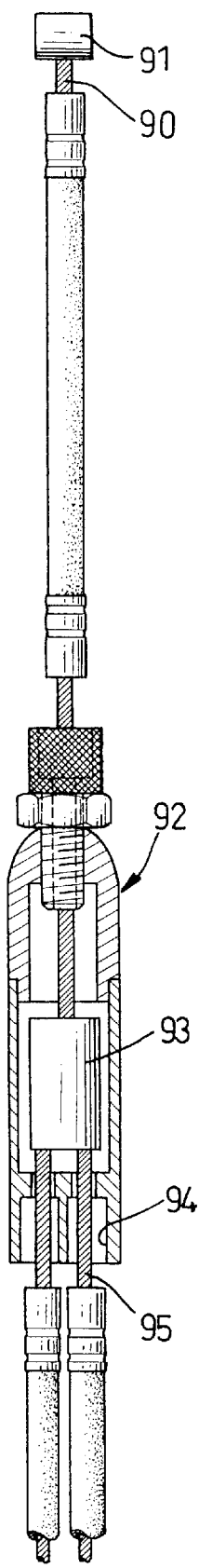
FIG. 4 is a cross-sectional view of a conventional brake wire connecting device for a stunt bike.

With reference to FIGS. 1, 2 and 3, the housing (20) includes an upper shell (201) and a lower shell (202). The upper shell (201) is defined with a chamber (2011). A male thread (2012) is formed around an outer surface of a bottom portion of the upper shell (201). The lower shell (202) has two adjacent stepped bores (2013) defined inside and a shoulder (2014) formed along a top periphery defining the stepped bores (2013). A female thread (2021) is formed around an inner surface of a top portion of the lower shell (202) to mate with the male thread (2012).

The main wire (30) has a first end formed with a stub (31) and a second end formed with a stopper (32) having a configuration that is able to be received in the slot (11) via the side opening (13) and retained therein by abutting the neck (14).

The branch wires (40) are securely attached to a bottom surface of the connector (10) and extend out of the connector (10).

In assembly, each of the two branch wires (40) extends out of the respective stepped bores (2013), and the bottom surface of the connector (10) which has the two branch wires attached engages with the shoulder (2014). The second end of the main cable (30) mounted with the stopper (32) extends through the upper shell (201), and the stopper (32) is pivotally received in the slot (11) with the main wire extending via the top opening (12). Due to tension in the main wire (30), the stopper (32) abutting the neck (14) is secured to the neck (14) thus the main wire (30) and the connector (10) is securely connected. By combining the male thread (2012) and the female thread (2021), the upper shell (201) and the lower shell (202) are screwed together with the connector (10) disposed inside the chamber (2011). Finally, the stub (31) is connected to a brake lever of the stunt bike and the branch wires (40) are connected to the brake system via a rotatable disk. The connector (10) is configured to be movable back and forth between the shoulder (2014) and a top end of the chamber (2011). In operation, the main wire (30), the connector (10), and the branch wires (40) connected together are driven by pulling or releasing the brake lever to control brake actions of the stunt bike. together are driven by pulling or releasing the brake lever to control brake actions of the stunt bike.

From the above description, it is noted that the invention has the following advantages:

1. The main wire (30) and the connector (10) with the branch wires (40) are able to be replaced separately.
2. The upper shell (201) and the lower shell (202) are detachably screwed together and thus allow inspection or maintenance inside the housing (20).
3. The stopper (32) is pivotally received inside the slot (11), such that when connecting the stub (31) to the handlebar stem the main wire (30) will not kink.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A brake wire connecting device for a stunt bike comprising:

a connector having a slot formed therein, a top opening being formed through a top surface of said connector, a side opening being formed through a side surface of said connector, said top opening and said side opening communicating with said slot, a neck being formed along a periphery of said top surface and defining said top opening;

a pair of branch wires securely attached to a bottom surface of said connector;

a housing having an upper shell and a lower shell, said upper shell having a chamber defined therein, said lower shell having a pair of stepped bores formed therein, said upper shell and said lower shell being selectively releasably connected together, said connector being disposed inside said chamber, a bottom surface of said connector engaging a pair of shoulders, said shoulders defining said stepped bores, each of said branch wires extending through a respective one of said stepped bores; and, a main wire having a first end, a stub being mounted on said first end, a second end of said main wire having a stopper mounted thereon, wherein said stopper extends into said upper shell and is pivotally received inside said slot.

2. The brake wire connecting device for the stunt as claimed in claim 1, wherein the upper shell and the lower shell are threadingly connected by a male thread formed on the upper shell and a female thread formed on the lower shell.

* * * * *